United States Patent Office 3,112,731
Patented Dec. 3, 1963

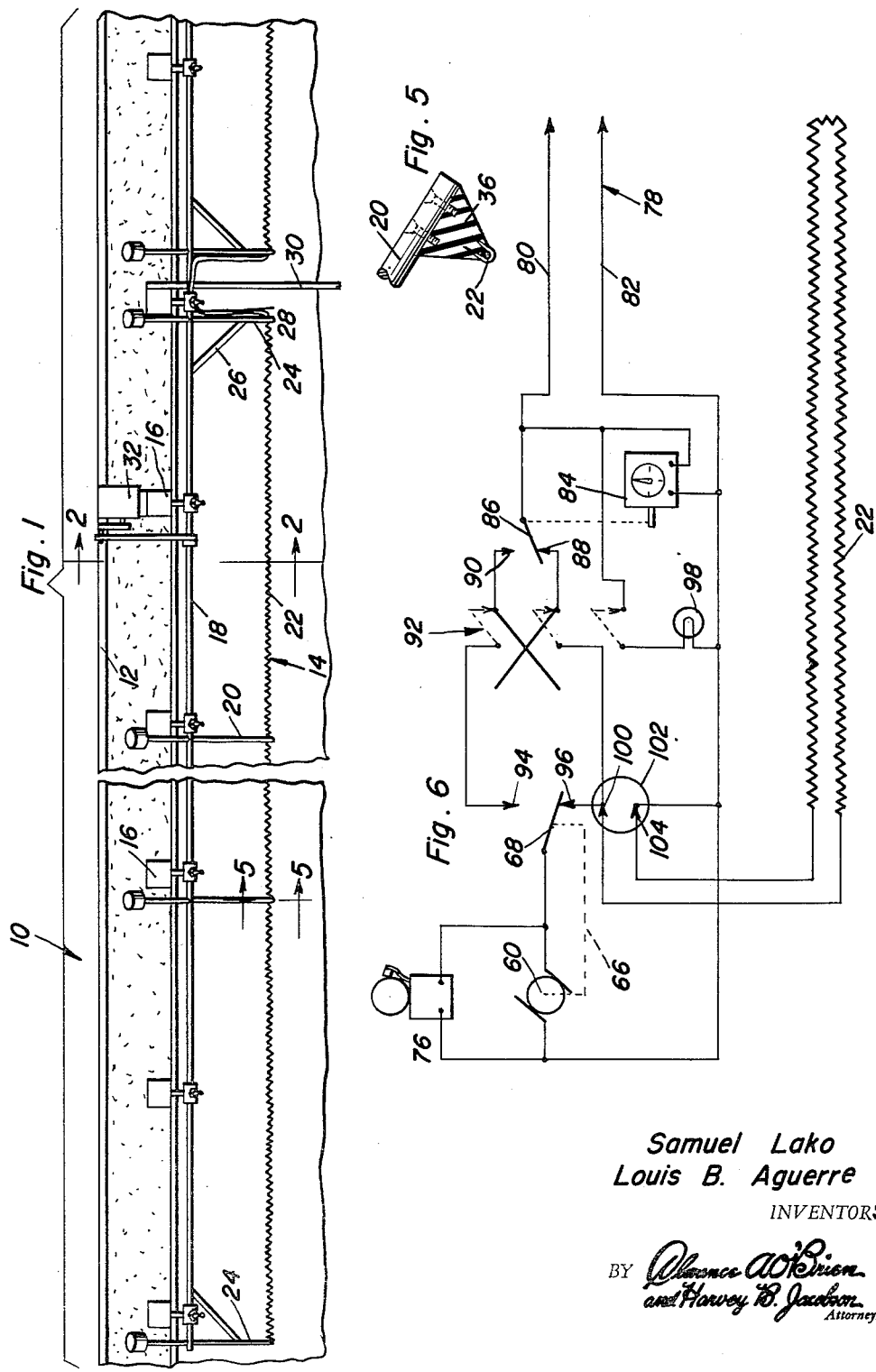

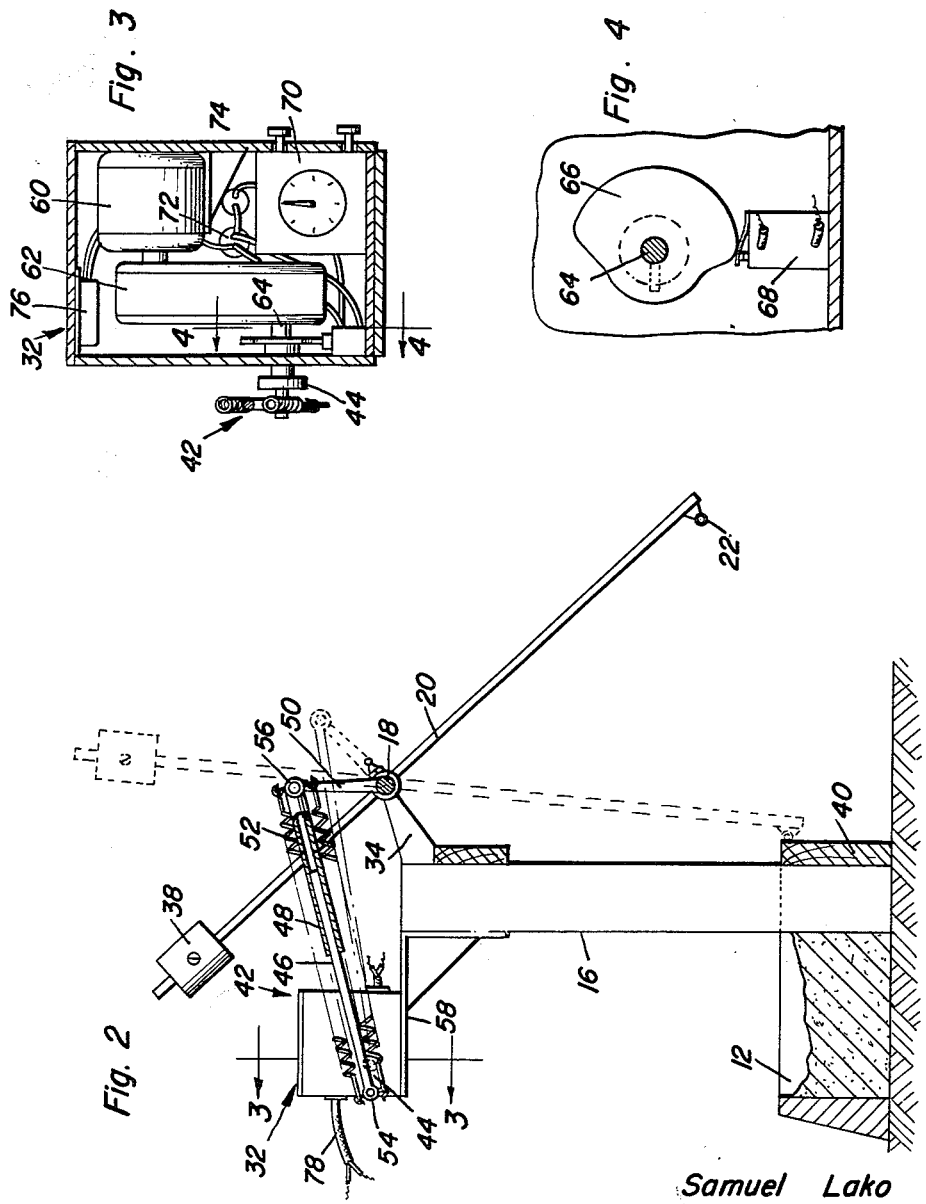

3,112,731
TIME CONTROLLED ELECTRIC BARRIER
FOR FEED TROUGHS
Samuel Lako and Louis B. Aguerre, both of
14009 Cypress Ave., Chino, Calif.
Filed Jan. 24, 1962, Ser. No. 168,328
17 Claims. (Cl. 119—51.12)

This invention relates to a feeding control device for animals and in particular to a periodically movable barrier intended to exclude cows or other domesticated animals from a feed manger during predetermined periods of time.

Under certain circumstances, the barring of domesticated animals from feed containing bins is desirable. For example, improvement in the milk obtained from cows may be achieved by preventing the cows from eating for several hours before milking. The desirability of the feed controlling device of the present invention will therefore become apparent under such circumstances since it would otherwise require human supervision for feed preparation several hours prior to the milking. Accordingly, a primary object of the present invention is to provide a time controlled feeding barrier whereby domesticated animals may be barred from feeding from feed bins prepared at a convenient time.

A further object of the present invention is to provide a feed control barrier which is operative in a manner less dangerous to domesticated animals by provision of a warning alert when the barrier is being automatically moved between retracted and extended positions.

An additional object of the present invention is to provide a feed control barrier device utilizing an electric fence energized under a novel control system for repelling domesticated animals only when the barrier is in the extended position for blocking access to the feeding bins.

A still further object of the present invention is to provide a barrier feed controlling system which will bar access to the feeding bins for a preselected period of time and which may also be manually overruled by premature control operation and subsequent reversal of the controls.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the feed control barrier arrangement of the present invention.

FIGURE 2 is a side sectional view taken substantially through a plane indicated by section line 2—2 in FIGURE 1.

FIGURE 3 is a sectional view taken substantially through a plane indicated by section line 3—3 in FIGURE 2.

FIGURE 4 is a partial sectional view taken substantially through a plane indicated by section line 4—4 in FIGURE 3.

FIGURE 5 is a partial sectional view taken substantially through a plane indicated by section line 5—5 in FIGURE 1.

FIGURE 6 is a wiring diagram of the control circuitry of the present invention.

Referring now to the drawings in detail, the control feed barrier arrangement of the present invention is generally refered to by reference numeral 10 as outlined in FIGURE 1. It will be observed therefore, that the feed control barrier arrangement 10 is associated with an elongated feed containing trough, bin or manger 12 or any other suitable feed containing receptacle having an access portion adapted to be approached by domesticated animals for feeding therefrom. Disposed forwardly of the feed containing trough 12, adjacent the access portion thereof is a movable barrier assembly generally referred to by reference numeral 14 which is mounted in proper position forwardly of the trough 12 by means of a plurality of spaced posts 16. Each of the posts 16 pivotally supports a torque rod member 18 to which a plurality of fence support arms 20 are connected adjacent to each of the posts 16. Interconnected with and supported by the support arms 20, are sections of electric fence wire or live barbed wire 22. Each fence section is therefore defined between end support arms 24 having suitable bracing 26. Adjacent sections of the fence assemblies are conductively coupled by insulated cable 28 that may traverse partitioning fences 30 disposed between the different sections of the electric fence barrier. Accordingly, the live wire 22 of each of the fence sections may be simultaneously energized and otherwise operated. Accordingly, movement of the fence is effected through a control box assembly 32 mounted on one of the posts 16 and operatively connected to the torque rod 18.

Referring therefrom to FIGURE 2 in particular, it will be observed that each of the post members 16 has connected thereto and projecting forwardly therefrom adjacent the upper end, a torque rod support bracket 34. The barrier support arms 20 are therefore rigidly secured to the torque rod 18 for pivotal movement therewith. The lower or forward end of the support arms 20 mount the electric fence wire 22 as more clearly seen in FIGURE 5 by means of an insulation mount 36. The upper ends of the support arms 20 have adjustably fixed thereto counterablancing weights 38. Accordingly, when the fence support arms 20 interconnected by the torque rod 18 are in a retracted position as illustrated by dotted lines in FIGURE 2, the lower ends thereof will be in engagement with the base portion 40 of the feed trough 12 so that the fence wire 22 will not bar access to the feed within the trough. In this retracted position, displacement of the fence assembly toward the extended position as shown by solid lines in FIGURE 2 will be resisted by the counterbalancing weight 38. Displacement of the fence support arms 20 in a counterclockwise direction to the solid line position illustrated in FIGURE 2, will be accomplished by means of a yieldable drive assembly generally referred to by reference numeral 42.

The yieldable drive assembly 42 includes therefore, a rotary drive crank 44 pivotally connected to a rod member 46 slidably received within a tubular member 48 which in turn is pivotally connected to a crank arm 50 fixed to the torque rod 18. A pair of spring elements 52 are anchored respectively to the pivotal connections 54 and 56 at the opposite ends of the rod 46 and tubular member 48. Accordingly, approximately 180° rotation of the rotary crank member 44 will impart 45° angular displacement to the crank arm 50. The torque rod 18 and fence support arms 20 will therefore undergo a limited stroke movement between the retracted and extended positions as illustrated in FIGURE 2 in response to continous uni-directional rotation of the rotary drive crank 44. Displacement of the fence support arms 20 and the electric fence wire 22 carried thereby between the retracted and extended positions will be under the control of the control box assembly 32 from which rotary drive crank 44 derives its motive power. The control box assembly 32 is therefore mounted on one of the post members 16 by means of a supporting bracket 58 disposed rearwardly thereof.

As more clearly seen in FIGURES 3 and 4, the control box 32 houses a drive motor 60 which is drivingly connected to the input of a reduction gear box 62 the output shaft 64 of which is connected to the yieldable drive assembly 42 by means of its rotary drive crank 44. Fixed to the shaft 64, is an actuating cam 66 which is engageable with a single-pole double-throw microswitch assembly 68. Also mounted within the control box 32, is a timer and reversing switch assembly generally referred to by reference numeral 70. The control box housing also mounts an electric fence plug-in receptacle 72 and an indicator lamp receptacle 74. Also mounted within the control box 32 is an alarm device 76. All of the components mounted within the control box are suitably wired to each other and electric power for operation thereof is supplied by means of a power cable 78.

Referring now to FIGURE 6 in particular, the wiring diagram for the control box is illustrated. It will be observed therefore, that the power cable 78 includes a pair of power lines 80 and 82 connected across the timer mechanism 84 that may be selectively set for any desirable timing cycle in a manner well known to those skilled in the art. Operatively controlled by the timer mechanism 84, is a single-pole double-throw switch 86 which connects the powerline 80 to either contact 88 as shown in FIGURE 6 when the timer 84 is set to a start position at the beginning of the timing cycle or powerline 80 is connected to contact 90 when the timer cycle is completed. A triple-pole double-throw reversing switch assembly 92 reversibly connects the switch contacts 88 and 90 to the contacts 94 and 96. In the normal position of the reversing switch 92 as illustrated in FIGURE 6, the contact 90 is connected to the contact 94 while the contact 88 is connected to the contact 96. The connections are reversed for the other position of the reversing switch 92. In the normal illustrated position of the reversing switch 92 the powerline 80 is also connected to one side of the indicator lamp 98 the other side of said lamp being connected to the powerline 82 so as to energize the lamp 98 when the reversing switch 92 is in a normal position. In the other position of the switch 92, the lamp 98 will not be energized. Contact 96 is connected to one terminal 100 of the electric wire fence outlet 102 the other terminal 104 of the outlet being connected to the power return line 82. The power return line 82 is also connected in parallel to the drive motor 60 and the barrier moving alarm device 76. The other terminals of the motor 60 and alarm device 76 are connected in parallel to the cam operated switch 68 which is either in contact with the contact 96 or contact 94. Energization of the electric fence wire 22 and movement of the fence assembly by energization of the electric motor 60 may be automatically controlled.

When the timer 84 is set to its start position, the timer operated switch 86 engages the contact 88 and remains in said position until the end of a timing cycle. The timer 84 is therefore connected across the lines 80 and 82 for energization thereof. With the reversing switch 92 in the normal illustrated position, and the cam operated switch 68 in engagement with the contact 96, the powerline 80 will be connected through the switch 86, contact 88, contact 96, switch 68 to one side of the electric motor 60 and alarm device 76 the other side of said motor and device being connected to the return line 82. Accordingly, the electric motor and alarm device will be simultaneously energized to move the fence barrier from the retracted position toward the extended position. At the same time, the powerline being connected to the contact 96 will also supply energizing current to the electric fence wire 22 through the receptacle 102. The lamp 98 will also be energized indicating that the reversing switch 92 is in the normal position. Accordingly, movement of the fence assembly by means of the support arms 20 proceeds while the device 76 issues an alerting signal so that animals will move out of the way of the moving fence. When the fence assembly has reached the extended position, the cam 66 will have actuated the switch 68 throwing it into engagement with the contact 94 to thereby disconnect the motor 60 and alarm device 76 from the powerline 80 previously connected thereto through the contact 96. The fence assembly will therefore remain in its extended position with the fence wire 22 being energized so as to repel any animals that may come in contact therewith. After the timing cycle has been completed, the timer mechanism 84 will operate the switch 86 so as to throw it into engagement with the contact 90. The fence outlet 102 will therefore be disconnected so as to de-energize the fence wire 22 while at the same time, the powerline 80 will be connected through the contact 90 and the contact 94 in engagement with the switch 68 to the motor 60 and alarm device 76 for simultaneous energization thereof. The fence assembly will therefore move in return movement toward the retracted position while a warning alert is being issued by the device 76. When the fence assembly arrives at the retracted position, the cam 66 will throw the switch 68 back to its original position in engagement with the contact 96 so as to complete the cycle of operation. If it is desired to retract the barrier assembly before the end of the timing cycle, the reversing switch 92 may be thrown to its other position to thereby disconnect the fence outlet 102 and at the same time connect the motor and alarm device through the cam switch 68 in engagement with the contact 94. Also, the indicator lamp 98 will be disconnected. The motor 60 will then be energized so as to move the barrier prematurely to the retracted position and thereafter throw the cam switch 68 to the position in engagement with the contact 96 thereby stopping operation thereof. Accordingly, when the timer mechanism 84 reaches the end of its timing cycle, the control operation will reverse and the barrier fence assembly will be moved to its extended position as hereinbefore described except that the indicator lamp 98 will not be energized so as to indicate the operative position of the reversing switch 92.

From the foregoing description, the operation and utility of the feed controlling device of the present invention will be apparent. It will therefore be appreciated, that reliable and safe operation of the fence assembly is achieved by virtue of the pivotal movement of the fence assembly through a yieldable drive mechanism which will avoid overloading of the motor 60 should the fence assembly be engaged with some obstacle. Furthermore, during movement of the fence assembly by energization of the motor 60, an alerting signal will be issued so as to prevent injury to domesticated animals in the vicinity. Furthermore, movement of the barrier fence assembly is automatically controlled in accordance with preselected time intervals by virtue of the novel control system also incorporating manual over-controlling reversing switch 92. The control system is readily adaptable for energization of an electric fence that may be simply plugged into the control box through the fence outlet 102.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A feeding control device comprising, feed containing means having a portion normally accessible to an animal being fed, movable barrier means adjacent said access portion, barrier moving means operatively connected to said barrier means for movement thereof from a retracted position adjacent said access portion to an extended position for blocking access to said feed containing means for a predetermined duration, alarm means operative in response to movement of said barrier means to provide an alerting signal for the duration of movement, said barrier means including an elongated electric fence rendered operative to carry current and thus repel an animal coming in contact therewith in response to movement of the barrier means toward said extended position and in operative in response to movement toward said retracted position.

2. The combination of claim 1, including timing means operatively connected to said barrier moving means to selectively vary said predetermined duration.

3. The combination of claim 2, including selectively operable reversing means operatively connected to said barrier moving means to prematurely effect movement of said barrier means independent of said timing means to said retracted position and subsequently reverse movement thereof after said predetermined duration.

4. The combination of claim 3, wherein said barrier means further comprises spaced post means, said fence means being balanced and pivotally mounted by said post means for unbalancing movement forwardly of said feed containing means toward said extended position.

5. The combination of claim 4, wherein said barrier moving means comprises, rotary drive means, and yieldable connecting means drivingly connecting said drive means to said barrier means for limited movement thereof between said retracted and extended positions.

6. The combination of claim 5, wherein said electric fence is mounted at a forward end of the barrier means in the extended position and electric energizing means operatively connected to said barrier moving means and fence for simultaneous energization thereof only when the barrier means is in one of said positions.

7. The combination of claim 6, wherein said alarm means comprises audible warning means operatively connected to said barrier moving means for simultaneous energization therewith.

8. The combination of claim 1, including selectively operable reversing means operatively connected to said barrier moving means to prematurely effect movement of said barrier means independent of said timing means to said retracted position and subsequently reverse movement thereof after said predetermined duration.

9. The combination of claim 1, wherein said barrier means comprises spaced post means, said fence means being balanced and pivotally mounted by said post means for unbalancing movement forwardly of said feed containing means toward said extended position.

10. The combination of claim 1, wherein said barrier moving means comprises, rotary drive means, and yieldable connecting means drivingly connecting said drive means to said barrier means for limited movement thereof between said retracted and extended positions.

11. The combination of claim 1, wherein said electric fence is mounted at a forward end of the barrier means in the extended position and electric energizing means operatively connected to said barrier moving means and fence for simultaneous energization thereof only when the barrier means is in one of said positions.

12. The combination of claim 1, wherein said alarm means comprises audible warning means operatively connected to said barrier moving means for simultaneous energization therewith.

13. A feeding control device comprising, feed containing means having a portion normally accessible to an animal being fed, movable barrier means adjacent said access portion, barrier moving means operatively connected to said barrier means for movement thereof from a retracted position adjacent said access portion to an extended position for blocking access to said feed containing means for a predetermined duration, said barrier means including an elongated electric fence rendered operative to carry current and thus repel an animal coming in contact therewith in response to movement of the barrier means toward said extended position and inoperative in response to movement toward said retracted position.

14. The combination of claim 13, wherein said barrier means comprises spaced post means, said fence means being balanced and pivotally mounted by said post means for unbalancing movement forwardly of said feed containing means toward said extended position.

15. The combination of claim 14, wherein said barrier moving means comprises, rotary drive means, and yieldable connecting means drivingly connecting said drive means to said barrier means for limited movement thereof between said retracted and extended positions.

16. The combination of claim 15, including timing means operatively connected to said barrier moving means to selectively vary said predetermined duration.

17. The combination of claim 16, wherein said electric fence is mounted at a forward end of the barrier means in the extended position and electric energizing means operatively connected to said barrier moving means and fence for simultaneous energization thereof only when the barrier means is in one of said positions.

References Cited in the file of this patent

UNITED STATES PATENTS

| | | |
|---|---|---|
| 2,708,901 | Adams | May 24, 1955 |
| 2,752,995 | Dodge | July 3, 1956 |
| 2,794,576 | Reynolds | June 4, 1957 |
| 2,806,965 | Soper | Sept. 17, 1957 |
| 2,814,271 | Black | Nov. 26, 1957 |

FOREIGN PATENTS

| | | |
|---|---|---|
| 24,996 | Finland | Oct. 12, 1951 |